F. S. HYATT.
VANITY BOX.
APPLICATION FILED MAR. 16, 1921.

1,422,981.

Patented July 18, 1922.

Inventor
Frank S. Hyatt
By his Attorneys
Townsend & Decker

UNITED STATES PATENT OFFICE.

FRANK S. HYATT, OF BROOKLYN, NEW YORK.

VANITY BOX.

1,422,981. Specification of Letters Patent. Patented July 18, 1922.

Application filed March 16, 1921. Serial No. 452,692.

*To all whom it may concern:*

Be it known that I, FRANK S. HYATT, a citizen of the United States, and a resident of Brooklyn, in the county of Kings and State of New York, have invented certain new and useful Improvements in Vanity Boxes, of which the following is a specification.

My present invention relates to vanity boxes and particularly to those which embody a mirror, usually in the cover part of the box.

The invention relates more particularly to the means for securing or holding the mirror of a vanity box in place whereby it will be securely held in place in the box and at the same time particular care will not be necessary to insure that it closely fits the contour of the part in which it is disposed.

The object of the invention is to effectively secure the mirror in the vanity box in such manner that it is not necessary to pay particular attention to the accurate dimensions of the mirror as compared to the part in which it is disposed and to secure this mounting without adding materially to the cost of the device over the usual construction as now commonly adopted.

The invention consists in the improved construction of vanity box and particularly the mirror-securing means thereof as hereinafter more particularly described and then specified in the claims.

Figure 1:
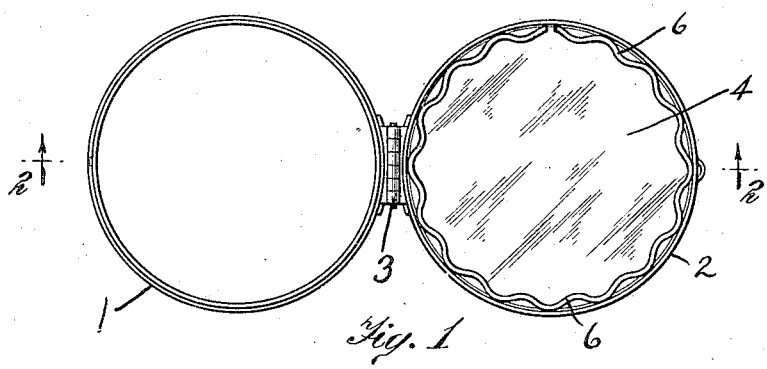

In the accompanying drawings Fig. 1 is a plan view of a vanity box, in open position, embodying the present invention.

Figure 2:
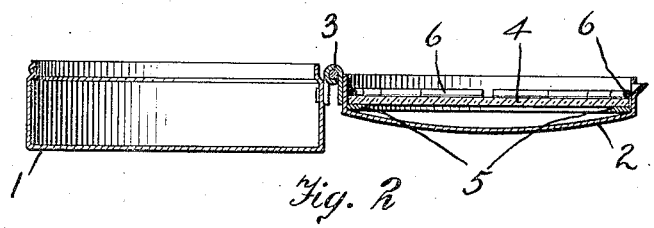

Fig. 2 is a vertical central cross-section through the same taken on the line 2—2 Fig. 1.

In the drawings, 1 indicates the bottom or body of the box and 2 indicates the cover usually hinged thereto as at 3.

In the illustrated case, a mirror 4 is associated with the cover 2. A ring or washer 5 preferably employed to protect the mirror on one of its sides is disposed between the mirror and the top of the cover 2.

6 indicates a fastening ring adapted to hold the mirror 4 in place in the cover 2 and against the washer 5 when such washer is employed. The ring 6 is preferably formed of spring wire and is corrugated in the plane of the ring so that it bears against the side walls of the cover at intervals and between such bearing points it overlaps the surface of the mirror and engages such surface for a greater or less distance from the peripheral edge of the mirror. In this way it is immaterial whether the diameter of the mirror closely approximates the inner diameter of the walls of the cover or not as the corrugations will necessarily engage and hold the same in place.

Previously it has been the practice to secure the mirror by a smooth, even surface wire which, if the mirror does not nicely fit in the box, gets down between the periphery of the mirror and the walls of the box and allows the mirror to drop out of place.

Also by employing the form of fastening wire in accordance with this invention, any rough edges on the mirror are more or less concealed by the corrugations in the wire 6 which do not need to be as pronounced as they are shown in the accompanying drawings for illustration.

What I claim as my invention is:—

1. In a vanity box, the combination with the box, of a mirror and a retaining wire held in place within the box by frictional engagement of its edge with the plain vertical surface of the sides of the box at separated places and at intermediate places adapted to overlap upon and engage directly the surface of the mirror as and for the purpose described.

2. In a vanity box, the combination with the box, of a mirror and a corrugated retaining ring of spring wire corrugated in the plane of the ring and engaging by the outer bends of the corrugations against the inside of the wall of the box so as to be held by frictional engagement therewith against displacement, said ring being applied over the edge of the visible face of the mirror and overlapping said edge by its inner bends so as to hold said mirror in place.

3. In a vanity box, the combination with the box, of a mirror and a corrugated spring wire adapted to press against the inner surface of the side walls of the box by some of its corrugations so as to be retained in frictional engagement therein and to engage by other corrugations upon the outer or visible surface of said mirror to hold the same in place in said box.

Signed at New York, in the county of Kings and State of New York, this 10th day of March A. D. 1921.

FRANK S. HYATT.

Witnesses:
ETHEL B. HALLER,
HAZEL BRILL.